US008207246B2

(12) United States Patent
Faucher et al.

(10) Patent No.: US 8,207,246 B2

(45) Date of Patent: Jun. 26, 2012

(54) PROCESSES FOR PRODUCING POLYESTER LATEXES VIA SOLVENT-FREE EMULSIFICATION

(75) Inventors: Santiago Faucher, Oakville (CA); Joo T. Chung, Webster, NY (US); Fumii Higuchi, Mississauga (CA); Shigang Qiu, Toronto (CA); Joseph L. Leonardo, Penfield, NY (US); Brian J. Andaya, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 392 days.

(21) Appl. No.: 12/512,398

(22) Filed: Jul. 30, 2009

(65) Prior Publication Data

US 2011/0028620 A1 Feb. 3, 2011

(51) Int. Cl.
*C08J 3/00* (2006.01)

(52) U.S. Cl. ........................................ 523/336

(58) Field of Classification Search .................. 523/336
See application file for complete search history.

(56) References Cited

U.S. PATENT DOCUMENTS 3,590,000 A 6/1971 Palermiti et al.
3,800,588 A 4/1974 Larson et al.
3,933,954 A 1/1976 Gebhard, Jr. et al.
4,056,653 A 11/1977 Gebhard, Jr. et al.
5,278,020 A 1/1994 Grushkin et al.
5,290,654 A 3/1994 Sacripante et al.
5,302,486 A 4/1994 Patel et al.
5,344,738 A 9/1994 Kmiecik-Lawrynowicz et al.
5,346,797 A 9/1994 Kmiecik-Lawrynowicz et al.
5,348,832 A 9/1994 Sacripante et al.
5,354,804 A 10/1994 Inada et al.
5,364,729 A 11/1994 Kmiecik-Lawrynowicz et al.
5,366,841 A 11/1994 Patel et al.
5,370,963 A 12/1994 Patel et al.
5,399,597 A 3/1995 Mandel et al.
5,403,693 A 4/1995 Patel et al.
5,405,728 A 4/1995 Hopper et al.
5,418,108 A 5/1995 Kmiecik-Lawrynowicz et al.
5,496,676 A 3/1996 Croucher et al.
5,501,935 A 3/1996 Patel et al.
5,527,658 A 6/1996 Hopper et al.
5,548,004 A 8/1996 Mandel et al.
5,585,215 A 12/1996 Ong et al.
5,650,255 A 7/1997 Ng et al.
5,650,256 A 7/1997 Veregin
5,723,253 A 3/1998 Higashino et al.
5,744,520 A 4/1998 Kmiecik-Lawrynowicz et al.
5,747,215 A 5/1998 Ong et al.
5,763,133 A 6/1998 Ong et al.
5,766,818 A 6/1998 Smith et al.
5,804,349 A 9/1998 Ong et al.
5,827,633 A 10/1998 Ong et al.
5,840,462 A 11/1998 Foucher et al.
5,853,943 A 12/1998 Cheng et al.
5,853,944 A 12/1998 Foucher et al.
5,863,698 A 1/1999 Patel et al.
5,869,215 A 2/1999 Ong et al.
5,902,710 A 5/1999 Ong et al.
5,910,387 A 6/1999 Mychajlowskij et al.
5,916,725 A 6/1999 Patel et al.
5,919,595 A 7/1999 Mychajlowskij et al.
5,925,488 A 7/1999 Patel et al.
5,977,210 A 11/1999 Patel et al.
5,994,020 A 11/1999 Patel et al.
6,063,827 A 5/2000 Sacripante et al.
6,080,807 A 6/2000 Campbell
6,512,024 B1 1/2003 Thumma et al.
6,593,049 B1 7/2003 Veregin et al.
6,756,176 B2 6/2004 Stegamat et al.
6,830,860 B2 12/2004 Sacripante et al.
7,064,156 B2 6/2006 Rink et al.
7,385,001 B2 6/2008 Shim et al.
2002/0074681 A1 6/2002 Lundgard et al.
2006/0222991 A1 10/2006 Sacripante et al.
2006/0286478 A1 12/2006 Chung et al.
2008/0107989 A1 5/2008 Sacripante et al.
2008/0138738 A1 6/2008 Chung et al.
2008/0138739 A1 6/2008 Chung et al.
2008/0153027 A1 6/2008 Veregin et al.

FOREIGN PATENT DOCUMENTS

WO WO 98/45356 A1 10/1998
WO WO 00/17256 A1 3/2000

OTHER PUBLICATIONS

U.S. Appl. No. 12/032,173, filed Feb. 15, 2008, Zhou et al.
U.S. Appl. No. 12/056,529, filed Mar. 27, 2008, Chung et al.
Ehrfeld, W.; Hessel, V.; Lowe, H. Microreactors—New Technology for Modern Chemistry, 1st Edition, Wiley-VCH, Weinhein 2001, 5-11.
Freitas, S., et al. Gander, B. Flow-through ultrasonic emulsification combined with static micromixing for Eur.J. of Pharma, and Biopharma., 2005, 61(3), 181-187.
Wischke, C.; Borchert, H.-H. Influence of the primary emulsification procedure of the characteristics of small . . . J. of Microencapsulation, 2006, 23(4), 435-448.
Schalper, K.; Harnisch, S.; Mueller, R.H.; Hildebrand, G.E. Preparation of Microparticles by Micromixers: Characterization of . . . Pharmaceutical Research, 2005 (22(2), 276-284.
Schalper, K. et al. A novel continuously acting microscale system for preparation of PLGA nano- and microparticles, Jun. 23-27, 2001, 2, 1390-1391.
Pinon-Segundo, E. et al., Preparation of nanoparticles by solvent displacement using a novel . . . Pharmaceutical Devlopment and Technology, 2006, 11(4), 493-501.
Scholes, P.D. et al, The preparation of sub-200 nanometer poly (lactide-co-glycolide) microspheres for site-specific . . . J. of Controlled Release, 1993, 25(1-2), 145-53.

*Primary Examiner* — Edward Cain
(74) *Attorney, Agent, or Firm* — MDIP LLC

(57) ABSTRACT

A process for making a latex emulsion suitable for use in a toner composition includes contacting a resin with a solid neutralizing agent in the absence of an organic solvent to form a mixture either via a co-feeding process or a pre-blend mixture, and adding a solid or aqueous surfactant to the pre-blend mixture or prior to melt mixing the mixture.

20 Claims, 7 Drawing Sheets

| DATA ITEM | VALUE | SIZE(um) | %TILE | %TILE | SIZE(um) |
|---|---|---|---|---|---|
| MV(um): | 0.2223 | | | 10.00 | 0.1466 |
| MN(um): | 0.1756 | | | 20.00 | 0.1640 |
| MA(um): | 0.2040 | | | 30.00 | 0.1787 |
| CS: | 29.42 | | | 40.00 | 0.1929 |
| SD: | 0.0679 | | | 50.00 | 0.2081 |
| MW: | 2.93E+09 | | | 60.00 | 0.2257 |
| Mz: | 0.2197 | | | 70.00 | 0.2474 |
| σι: | 0.0678 | | | 80.00 | 0.2776 |
| Ski: | 0.2991 | | | 90.00 | 0.323 |
| Kg: | 1.022 | | | 95.00 | 0.358 |

| DIA(um) | VOL% | WIDTH |
|---|---|---|
| 0.2081 | 100.0 | 0.14 |
| | | |
| | | |
| | | |
| | | |
| | | |

| UDeF NAME | UDeF DATA |
|---|---|
| | |
| | |
| | |

| DATA ITEM | VALUE | SIZE(um) | %TILE | %TILE | SIZE(um) |
|---|---|---|---|---|---|
| MV(um): | 0.1432 | | | 10.00 | 0.0724 |
| MN(um): | 0.0876 | | | 20.00 | 0.0884 |
| MA(um): | 0.1195 | | | 30.00 | 0.1032 |
| CS: | 50.16 | | | 40.00 | 0.1177 |
| SD: | 0.0599 | | | 50.00 | 0.1322 |
| MW: | 7.50E+08 | | | 60.00 | 0.1480 |
| Mz: | 0.1388 | | | 70.00 | 0.1663 |
| σι: | 0.0602 | | | 80.00 | 0.1897 |
| Ski: | 0.2417 | | | 90.00 | 0.2271 |
| Kg: | 1.809 | | | 95.00 | 0.2641 |

| DIA(um) | VOL% | WIDTH |
|---|---|---|
| 0.1322 | 100.0 | 0.12 |
| | | |
| | | |
| | | |
| | | |
| | | |

| UDeF NAME | UDeF DATA |
|---|---|
| | |
| | |
| | |

| DATA ITEM | VALUE | SIZE(um) | %TILE | %TILE | SIZE(um) |
|---|---|---|---|---|---|
| MV(um): | 0.1855 | | | 10.00 | 0.1188 |
| MN(um): | 0.1427 | | | 20.00 | 0.1341 |
| MA(um): | 0.1877 | | | 30.00 | 0.1484 |
| CS: | 35.79 | | | 40.00 | 0.1681 |
| SD: | 0.0687 | | | 50.00 | 0.1704 |
| MW: | 1.61E+09 | | | 60.00 | 0.1848 |
| Mz: | 0.1804 | | | 70.00 | 0.2022 |
| σι: | 0.0607 | | | 80.00 | 0.2278 |
| Ski: | 0.346 | | | 90.00 | 0.2753 |
| Kg: | 1.202 | | | 95.00 | 0.323 |

| DIA(um) | VOL% | WIDTH |
|---|---|---|
| 0.1704 | 100.0 | 0.11 |
| | | |
| | | |
| | | |
| | | |
| | | |

| UDeF NAME | UDeF DATA |
|---|---|
| | |
| | |
| | |

PROCESSES FOR PRODUCING POLYESTER LATEXES VIA SOLVENT-FREE EMULSIFICATION

TECHNICAL FIELD

The present disclosure relates to processes for producing resin emulsions useful in producing toners. More specifically, solvent-free continuous processes are provided for emulsification of high yield polyester resins utilizing extruders.

BACKGROUND

Numerous processes are within the purview of those skilled in the art for the preparation of toners. Emulsion aggregation (EA) is one such method. Emulsion aggregation toners may be used in forming print and/or xerographic images. Emulsion aggregation techniques may involve the formation of a polymer emulsion by heating a monomer and undertaking a batch or semi-continuous emulsion polymerization, as disclosed in, for example, U.S. Pat. No. 5,853,943, the disclosure of which is hereby incorporated by reference in its entirety. Other examples of emulsion/aggregation/coalescing processes for the preparation of toners are illustrated in U.S. Pat. Nos. 5,902,710; 5,910,387; 5,916,725; 5,919,595; 5,925,488, 5,977,210, 5,994,020, and U.S. Patent Application Publication No. 2008/0107989, the disclosures of each of which are hereby incorporated by reference in their entirety.

Polyester toners have been prepared utilizing amorphous and crystalline polyester resins as illustrated, for example, in U.S. Patent Application Publication No. 2008/0153027, the disclosure of which is hereby incorporated by reference in its entirety. The incorporation of these polyesters into the toner requires that they first be formulated into emulsions prepared by solvent containing batch processes, for example solvent flash emulsification and/or solvent-based phase inversion emulsification (PIE), which is both time and energy-consuming. In both cases, large amounts of organic solvents, such as ketones or alcohols, have been used to dissolve the resins, which may require subsequent energy intensive distillation to form the latexes, and are not environmentally friendly.

Solventless latex emulsions have been formed in either a batch or extrusion process through the addition of a neutralizing solution, a surfactant solution and water to a thermally softened resin as illustrated, for example, in U.S. patent application Ser. Nos. 12/032,173 and 12/056,529, the disclosures of each of which are hereby incorporated by reference in their entirety. However, a small amount of coarse material remains un-emulsified in these processes and so the conversion of the resin to the latex is not complete. The latexes must therefore be treated to remove this coarse content or a polishing step must be added to convert the residual resin or coarse material into latex particles. For example filtration may be used to remove any coarse material while ultrasonication, and/or homogenization using external high shear devices may be applied to the latex produced from the extruder to complete the conversion. The additional process steps are however not desirable as they add complexity, energy consumption and cost.

It would be advantageous to provide a process for the preparation of a polymer latex suitable for use in a toner product that is more efficient, takes less time, and has a high product yield.

SUMMARY

Solvent free continuous processes for forming high yield, low coarse content, polyester latexes are disclosed which are then utilized in forming a toner. In embodiments, a process is provided which includes contacting at least one polyester resin with a solid neutralizing agent such as ammonium hydroxide flakes, potassium hydroxide flakes, sodium hydroxide flakes, sodium carbonate flakes, sodium bicarbonate flakes, lithium hydroxide flakes, potassium carbonate flakes, organoamines, and combinations thereof, in the absence of an organic solvent to form a pre-blend mixture; contacting the pre-blend mixture with a surfactant; melt mixing the mixture; contacting the melt mixed mixture with de-ionized water to form an oil in water emulsion; and continuously recovering latex particles.

In other embodiments, a process is provided which includes contacting at least one polyester resin and a solid neutralizing agent such as ammonium hydroxide flakes, potassium hydroxide flakes, sodium hydroxide flakes, sodium carbonate flakes, sodium bicarbonate flakes, lithium hydroxide flakes, potassium carbonate flakes, organoamines, and combinations thereof, in the absence of an organic solvent to form a mixture; contacting the mixture with a surfactant; melt mixing the mixture; contacting the melt mixed mixture with de-ionized water to form an oil in water emulsion; and continuously recovering latex particles having a coarse content of from about 0.01% to about 1%.

In yet other embodiments, a process is provided including contacting at least one polyester resin and sodium hydroxide flakes in the absence of an organic solvent to form a mixture; contacting the mixture with a solid surfactant; melt mixing the mixture; contacting the melt mixed mixture with de-ionized water to form an oil in water emulsion; and continuously recovering latex particles having a coarse content of from about 0.01% to about 1%.

BRIEF DESCRIPTION OF DRAWINGS

Various embodiments of the present disclosure will be described herein below with reference to the figures wherein.

DETAILED DESCRIPTION

Figure 1:
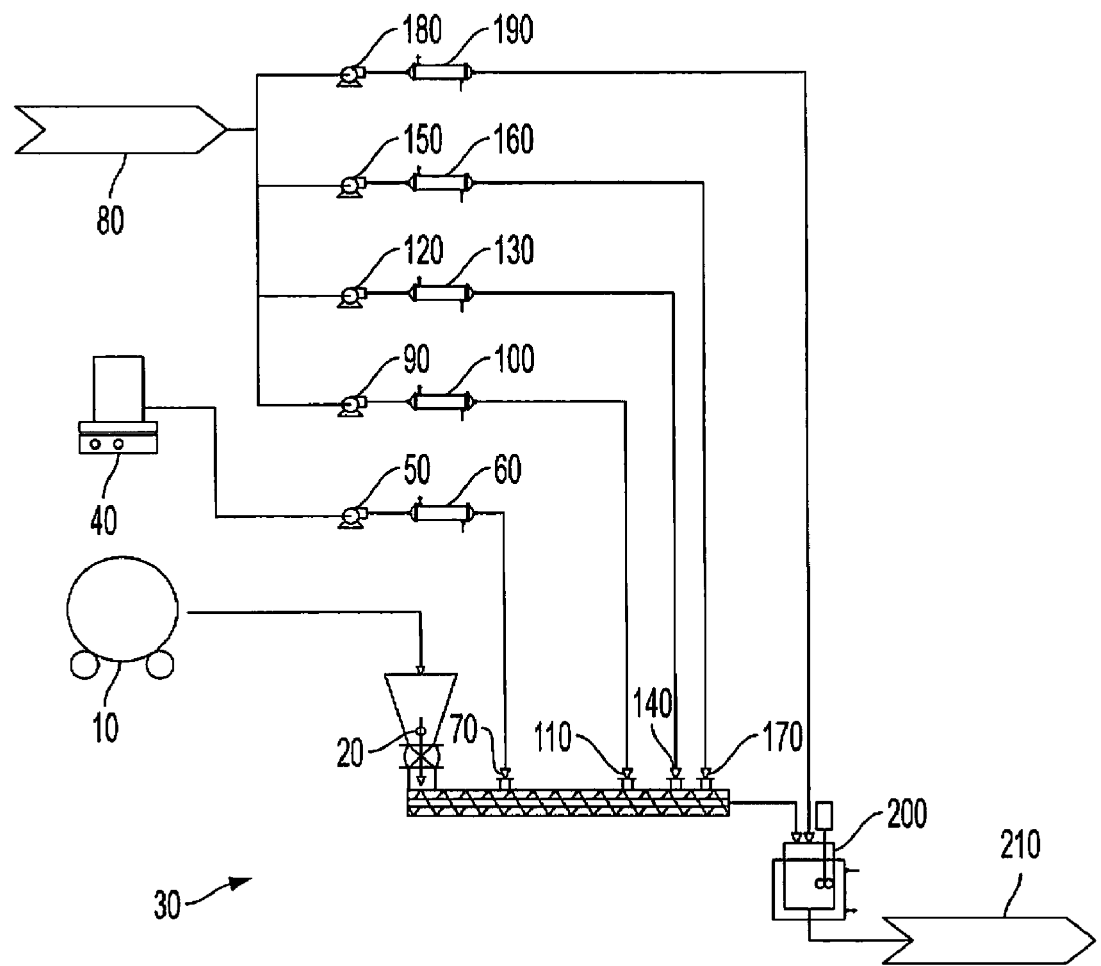
FIG. 1 is a flow chart depicting an extruder process for the preparation of a polyester latex in accordance with Example 1 of the present disclosure.

The present disclosure provides solvent free processes for forming high yield, low coarse content, polyester latexes which may be utilized in forming a toner.

In embodiments, the present disclosure provides a continuous process which includes contacting at least one polyester resin with a solid neutralizing agent in the absence of an organic solvent to form a pre-blend mixture; contacting the pre-blend mixture with a surfactant; melt mixing the mixture;

contacting the melt mixed mixture with de-ionized water at three subsequent intervals to form an emulsion; and continuously recovering latex particles having low coarse content.

In embodiments, the present disclosure provides a continuous process which includes co-feeding at least one polyester resin and a neutralizing agent into a screw feeder in the absence of an organic solvent to form a mixture; contacting the mixture with a surfactant; melt mixing the mixture; contacting the melt mixed mixture with de-ionized water at three subsequent intervals to form an emulsion; and continuously recovering latex particles having low coarse content.

In embodiments, the present disclosure provides a high yield toner with low coarse content which includes at least one polyester resin in the absence of an organic solvent; a solid neutralizing agent selected from the group consisting of sodium hydroxide, potassium hydroxide, sodium carbonate, sodium bicarbonate, lithium hydroxide, potassium carbonate, organoamines such as piperazine, and the like.; a surfactant; de-ionized water; and optionally one or more additional ingredients of a toner composition; wherein the coarse content of the latex is from about 0.01% to about 1% of the total solids.

As used herein, "the absence of an organic solvent" includes, in embodiments, for example, that organic solvents are not used to dissolve the resin or neutralizing agent for emulsification. However, it is understood that minor amounts of such solvents may be present in such resins as a consequence of their use in the process of forming the resin.

Resins

Any resin may be utilized in forming a latex emulsion of the present disclosure. In embodiments, the resins may be an amorphous resin, a crystalline resin, and/or a combination thereof. In further embodiments, the resin may be a polyester resin, including the resins described in U.S. Pat. Nos. 6,593,049 and 6,756,176, the disclosures of each of which are hereby incorporated by reference in their entirety. Suitable resins may also include a mixture of an amorphous polyester resin and a crystalline polyester resin as described in U.S. Pat. No. 6,830,860, the disclosure of which is hereby incorporated by reference in its entirety.

In embodiments, the resin may be a polyester resin formed by reacting a diol with a diacid in the presence of an optional catalyst. For forming a crystalline polyester, suitable organic diols include aliphatic diols with from about 2 to about 36 carbon atoms, such as 1,2-ethanediol, 1,3-propanediol, 1,4-butanediol, 1,5-pentanediol, 2,2-dimethylpropane-1,3-diol, 1,6-hexanediol, 1,7-heptanediol, 1,8-octanediol, 1,9-nonanediol, 1,10-decanediol, 1,12-dodecanediol and the like including their structural isomers. The aliphatic diol may be, for example, selected in an amount of from about 40 to about 60 mole percent, in embodiments from about 42 to about 55 mole percent, in embodiments from about 45 to about 53 mole percent, and a second diol can be selected in an amount of from about 0 to about 10 mole percent, in embodiments from about 1 to about 4 mole percent of the resin.

Examples of organic diacids or diesters including vinyl diacids or vinyl diesters selected for the preparation of the crystalline resins include oxalic acid, succinic acid, glutaric acid, adipic acid, suberic acid, azelaic acid, sebacic acid, fumaric acid, dimethyl fumarate, dimethyl itaconate, cis, 1,4-diacetoxy-2-butene, diethyl fumarate, diethyl maleate, phthalic acid, isophthalic acid, terephthalic acid, naphthalene-2,6-dicarboxylic acid, naphthalene-2,7-dicarboxylic acid, cyclohexane dicarboxylic acid, malonic acid and mesaconic acid, a diester or anhydride thereof. The organic diacid may be selected in an amount of, for example, in embodiments from about 40 to about 60 mole percent, in embodiments from about 42 to about 52 mole percent, in embodiments from about 45 to about 50 mole percent, and a second diacid can be selected in an amount of from about 0 to about 10 mole percent of the resin.

Examples of crystalline resins include polyesters, polyamides, polyimides, polyolefins, polyethylene, polybutylene, polyisobutyrate, ethylene-propylene copolymers, ethylene-vinyl acetate copolymers, polypropylene, mixtures thereof, and the like. Specific crystalline resins may be polyester based, such as poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), poly(decylene-sebacate), poly(decylene-decanoate), poly(ethylene-decanoate), poly(ethylene dodecanoate), poly(nonylene-sebacate), poly(nonylene-decanoate), copoly(ethylene-fumarate)-copoly(ethylene-sebacate), copoly(ethylene-fumarate)-copoly(ethylene-decanoate), copoly(ethylene-fumarate)-copoly (ethylene-dodecanoate), copoly(2,2-dimethylpropane-1,3-diol-decanoate)-copoly(nonylene-decanoate), poly(octylene-adipate). Examples of polyamides include poly(ethylene-adipamide), poly(propylene-adipamide), poly(butylenes-adipamide), poly(pentylene-adipamide), poly(hexylene-adipamide), poly(octylene-adipamide), poly(ethylene-succinimide), and poly(propylene-sebecamide). Examples of polyimides include poly(ethylene-adipimide), poly(propylene-adipimide), poly(butylene-adipimide), poly(pentylene-adipimide), poly(hexylene-adipimide), poly(octylene-adipimide), poly(ethylene-succinimide), poly(propylene-succinimide), and poly(butylene-succinimide).

The crystalline resin may be present, for example, in an amount of from about 1 to about 50 percent by weight of the toner components, in embodiments from about 5 to about 35 percent by weight of the toner components. The crystalline resin can possess various melting points of, for example, from about 30° C. to about 120° C., in embodiments from about 50° C. to about 90° C. The crystalline resin may have a number average molecular weight ($M_n$), as measured by gel permeation chromatography (GPC) of, for example, from about 1,000 to about 50,000, in embodiments from about 2,000 to about 25,000, and a weight average molecular weight ($M_w$) of, for example, from about 2,000 to about 100,000, in embodiments from about 3,000 to about 80,000, as determined by Gel Permeation Chromatography using polystyrene standards. The molecular weight distribution ($M_w/M_n$) of the crystalline resin may be, for example, from about 2 to about 6, in embodiments from about 3 to about 4.

Examples of diacids or diesters including vinyl diacids or vinyl diesters utilized for the preparation of amorphous polyesters include dicarboxylic acids or diesters such as terephthalic acid, phthalic acid, isophthalic acid, fumaric acid, trimellitic acid, dimethyl fumarate, dimethyl itaconate, cis, 1,4-diacetoxy-2-butene, diethyl fumarate, diethyl maleate, maleic acid, succinic acid, itaconic acid, succinic acid, succinic anhydride, dodecylsuccinic acid, dodecylsuccinic anhydride, glutaric acid, glutaric anhydride, adipic acid, pimelic acid, suberic acid, azelaic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and combinations thereof The organic diacids or diesters may be present, for example, in an amount from about 40 to about 60 mole percent of the resin, in embodiments from about 42 to about 52 mole percent of the resin, in embodiments from about 45 to about 50 mole percent of the resin.

Examples of diols which may be utilized in generating the amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hydroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, bis(2-hydroxyethyl)oxide, dipropylene glycol, dibutylene, and combinations thereof. The amount of organic diols selected can vary, and may be present, for example, in an amount from about 40 to about 60 mole percent of the resin, in embodiments from about 42 to about 55 mole percent of the resin, in embodiments from about 45 to about 53 mole percent of the resin.

Polycondensation catalysts which may be utilized in forming either the crystalline or amorphous polyesters include tetraalkyl titanates, dialkyltin oxides such as dibutyltin oxide, tetraalkyltins such as dibutyltin dilaurate, and dialkyltin oxide hydroxides such as butyltin oxide hydroxide, aluminum alkoxides, alkyl zinc, dialkyl zinc, zinc oxide, stannous oxide, or combinations thereof. Such catalysts may be utilized in amounts of, for example, from about 0.01 mole percent to about 5 mole percent based on the starting diacid or diester used to generate the polyester resin.

In embodiments, as noted above, an unsaturated amorphous polyester resin may be utilized as a latex resin. Examples of such resins include those disclosed in U.S. Pat. No. 6,063,827, the disclosure of which is hereby incorporated by reference in its entirety. Exemplary unsaturated amorphous polyester resins include, but are not limited to, poly(propoxylated bisphenol co-fumarate), poly(ethoxylated bisphenol co-fumarate), poly(butyloxylated bisphenol co-fumarate), poly(co-propoxylated bisphenol co-ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly(co-propoxylated bisphenol co-ethoxylated bisphenol co-maleate), poly(1,2-propylene maleate), poly(propoxylated bisphenol co-itaconate), poly(ethoxylated bisphenol co-itaconate), poly(butyloxylated bisphenol co-itaconate), poly(co-propoxylated bisphenol co-ethoxylated bisphenol co-itaconate), poly(1,2-propylene itaconate), and combinations thereof.

In embodiments, a suitable polyester resin may be an amorphous polyester such as a poly(propoxylated bisphenol A co-fumarate) resin having the following formula (I):

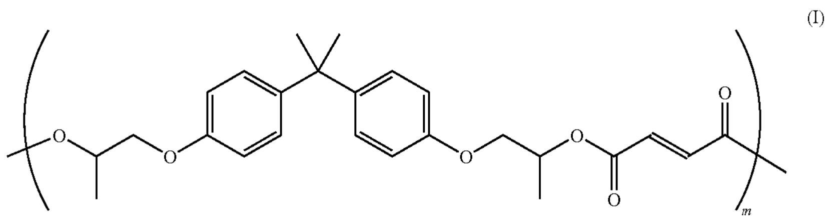

(I)

wherein m may be from about 5 to about 1000. Examples of such resins and processes for their production include those disclosed in U.S. Pat. No. 6,063,827, the disclosure of which is hereby incorporated by reference in its entirety.

An example of a linear propoxylated bisphenol A fumarate resin which may be utilized as a latex resin is available under the trade name SPARII from Resana S/A Industrias Quimicas, Sao Paulo Brazil. Other propoxylated bisphenol A fumarate resins that may be utilized and are commercially available include GTUF and FPESL-2 from Kao Corporation, Japan, and EM181635 from Reichhold, Research Triangle Park, N.C., and the like.

Suitable crystalline resins which may be utilized, optionally in combination with an amorphous resin as described above, include those disclosed in U.S. Patent Application Publication No. 2006/0222991, the disclosure of which is hereby incorporated by reference in its entirety. In embodiments, a suitable crystalline resin may include a resin formed of ethylene glycol and a mixture of dodecanedioic acid and fumaric acid co-monomers with the following formula:

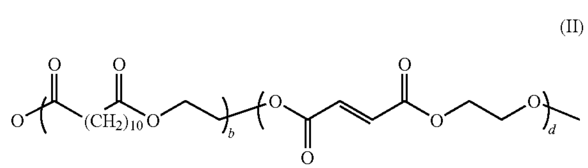

(II)

wherein b is from about 5 to about 2000 and d is from about 5 to about 2000.

For example, in embodiments, a poly(propoxylated bisphenol A co-fumarate) resin of formula I as described above may be combined with a crystalline resin of formula II to form a latex emulsion.

The amorphous resin may be present, for example, in an amount of from about 30 to about 90 percent by weight of the toner components, in embodiments from about 40 to about 80 percent by weight of the toner components. In embodiments, the amorphous resin or combination of amorphous resins utilized in the latex may have a glass transition temperature of from about 30° C. to about 80° C., in embodiments from about 35° C. to about 70° C. In further embodiments, the combined resins utilized in the latex may have a melt viscosity of from about 10 to about 1,000,000 Pa·S at about 130° C., in embodiments from about 50 to about 100,000 Pa·S.

One, two, or more resins may be used. In embodiments, where two or more resins are used, the resins may be in any suitable ratio (e.g., weight ratio) such as for instance of from about 1% (first resin)/99% (second resin) to about 99% (first resin)/1% (second resin), in embodiments from about 10% (first resin)/90% (second resin) to about 90% (first resin)/10% (second resin), Where the resin includes an amorphous resin and a crystalline resin, the weight ratio of the two resins may be from about 99% (amorphous resin):1% (crystalline resin), to about 1% (amorphous resin):90% (crystalline resin).

In embodiments the resin may possess acid groups which, in embodiments, may be present at the terminal of the resin. Acid groups which may be present include carboxylic acid groups, and the like. The number of carboxylic acid groups may be controlled by adjusting the materials utilized to form the resin and reaction conditions.

In embodiments, the resin may be a polyester resin having an acid number from about 2 mg KOH/g of resin to about 200 mg KOH/g of resin, in embodiments from about 5 mg KOH/g of resin to about 50 mg KOH/g of resin. The acid containing resin may be dissolved in tetrahydrofuran solution. The acid number may be detected by titration with KOH/methanol solution containing phenolphthalein as the indicator. The acid number may then be calculated based on the equivalent amount of KOH/methanol required to neutralize all the acid groups on the resin identified as the end point of the titration.

Neutralizing Agent

In embodiments, the resin may be pre-blended with a weak base or neutralizing agent. In embodiments the base may be a solid, thereby eliminating the need to utilize a solution, which avoids the risks and difficulties associated with pumping of the solution.

In embodiments, the resin and the neutralizing agent may be simultaneously fed through a co-feeding process, which may accurately control the feed rate of both the base and the resin into the extruder throughout the process, and which may then be melt mixed followed by emulsification. Utilizing this process allows for control of the base concentration and a more efficient process. Co-feeding may allow for process repeatability and stability, and significantly lower initial start-up waste.

In embodiments, the neutralizing agent may be used to neutralize acid groups in the resins, so a neutralizing agent herein may also be referred to as a "basic neutralization agent." Any suitable basic neutralization reagent may be used in accordance with the present disclosure. In embodiments, suitable basic neutralization agents may include both inorganic basic agents and organic basic agents. Suitable basic agents may include ammonium hydroxide, potassium hydroxide, sodium hydroxide, sodium carbonate, sodium bicarbonate, lithium hydroxide, potassium carbonate, combinations thereof, and the like. Suitable basic agents may also include monocyclic compounds and polycyclic compounds having at least one nitrogen atom, such as, for example, secondary amines, which include aziridines, azetidines, piperazines, piperidines, pyridines, bipyridines, terpyridines, dihydropyridines, morpholines, N-alkylmorpholines, 1,4-diazabicyclo[2.2.2]octanes, 1,8-diazabicycloundecanes, 1,8-diazabicycloundecenes, dimethylated pentylamines, trimethylated pentylamines, pyrimidines, pyrroles, pyrrolidines, pyrrolidinones, indoles, indolines, indanones, benzindazones, imidazoles, benzimidazoles, imidazolones, imidazolines, oxazoles, isoxazoles, oxazolines, oxadiazoles, thiadiazoles, carbazoles, quinolines, isoquinolines, naphthyridines, triazines, triazoles, tetrazoles, pyrazoles, pyrazolines, and combinations thereof. In embodiments, the monocyclic and polycyclic compounds may be unsubstituted or substituted at any carbon position on the ring.

In embodiments, an emulsion formed in accordance with the present disclosure may also include a small quantity of water, in embodiments, de-ionized water (DIW), in amounts of from about 30% to about 95%, in embodiments, of from about 30% to about 60%, at temperatures that melt or soften the resin, of from about 40° C. to about 140° C., in embodiments from about 60° C. to about 100° C.

The basic agent may be utilized as a solid such as, for example, sodium hydroxide flakes, so that it is present in an amount of from about 0.001% by weight to 50% by weight of the resin, in embodiments from about 0.01% by weight to about 25% by weight of the resin, in embodiments from about 0.1% by weight to 5% by weight of the resin.

As noted above, the basic neutralization agent may be added to a resin possessing acid groups. The addition of the basic neutralization agent may thus raise the pH of an emulsion including a resin possessing acid groups from about 5 to about 12, in embodiments, from about 6 to about 11. The neutralization of the acid groups may, in embodiments, enhance formation of the emulsion.

Surfactants

In embodiments, the process of the present disclosure may include adding a surfactant, before or during the melt mixing, to the resin at an elevated temperature. In embodiments, the surfactant may be added prior to melt-mixing the resin at an elevated temperature. In embodiments, a solid surfactant may be co-fed with the resin and the neutralizing agent into the extruder. In embodiments, a solid surfactant may be added to the resin and neutralizing agent to form a pre-blend mixture prior to melt mixing. Where utilized, a resin emulsion may include one, two, or more surfactants. The surfactants may be selected from ionic surfactants and nonionic surfactants. Anionic surfactants and cationic surfactants are encompassed by the term "ionic surfactants." In embodiments, the surfactant may be added as a solid or as a solution with a concentration of from about 5% to about 100% (pure surfactant) by weight, in embodiments, from about 10% to about 95% by weight. In embodiments, the surfactant may be utilized so that it is present in an amount of from about 0.01% to about 20% by weight of the resin, in embodiments, from about 0.1% to about 16% by weight of the resin, in other embodiments, from about 1% to about 14% by weight of the resin.

Anionic surfactants which may be utilized include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Aldrich, NEOGEN R™, NEOGEN SC™ obtained from Daiichi Kogyo Seiyaku, combinations thereof, and the like. Other suitable anionic surfactants include, in embodiments, DOWFAX™™ 2A1, an alkyldiphenyloxide disulfonate from The Dow Chemical Company, and/or TAYCA POWER BN2060 from Tayca Corporation (Japan), which are branched sodium dodecylbenzene sulfonates. Combinations of these surfactants and any of the foregoing anionic surfactants may be utilized in embodiments.

Examples of the cationic surfactants, which are usually positively charged, include, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Chemicals, and the like, and mixtures thereof.

Examples of nonionic surfactants that may be utilized for the processes illustrated herein include, for example, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly (ethyleneoxy) ethanol, available from Rhone-Poulenc as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™. Other examples of suitable nonionic surfactants may include a block copolymer of polyethylene oxide and polypropylene oxide, including those commercially available as SYNPERONIC PE/F, in embodiments SYNPERONIC PE/F 108. Combinations of these surfactants and any of the foregoing surfactants may be utilized in embodiments.

Processing

As noted above, the present continuous process includes melt mixing a mixture at an elevated temperature containing a resin, a solid or aqueous surfactant, and a solid neutralizing agent, wherein an organic solvent is not utilized in the process, to form a latex emulsion. In embodiments, the resin and the neutralizing agent may be pre-blended prior to melt mixing. In embodiments, the resin may be co-fed into a screw feeder with the solid neutralizing agent.

More than one resin may be utilized in forming the latex. As noted above, the resin may be an amorphous resin, a crystalline resin, or a combination thereof In embodiments, the resin may be an amorphous resin and the elevated temperature may be a temperature above the glass transition temperature of the amorphous resin. In other embodiments, the resin may be a crystalline resin and the elevated temperature may be a temperature above the melting point of the crystalline resin. In further embodiments, the resin may be a mixture of amorphous and crystalline resins and the temperature may be above the glass transition temperature of the mixture.

In embodiments, the neutralizing agent which may be utilized includes sodium hydroxide flakes, although other agents mentioned hereinabove may be utilized. In embodiments, the surfactant utilized may be an aqueous solution of alkyldiphenyloxide disulfonate, to ensure that proper resin neutralization occurs when utilizing NaOH flakes and leads to a high quality latex with low coarse content. Alternatively, a solid surfactant of sodium dodecyl benzene sulfonate may be utilized and co-fed with the resin into the extruder feed hopper eliminating the need to use a solution to simplify and create a more efficient process.

In embodiments, the surfactant may be added to the one or more ingredients of the resin composition before, during, or after melt-mixing. In embodiments, the surfactant may be added before, during, or after the addition of the neutralizing agent. In embodiments, the surfactant may be added prior to the addition of the neutralizing agent. In embodiments, a solid surfactant may be added to the pre-blend mixture prior to melt mixing.

The elevated temperature may be from about 30° C. to about 300° C., in embodiments from about 50° C. to about 200° C., in other embodiments from about 70° C. to about 150° C.

Melt mixing may be conducted in an extruder, i.e. a twin screw extruder, a kneader such as a Haake mixer, a batch reactor, or any other device capable of intimately mixing viscous materials to create near homogenous mixtures.

Stirring, although not necessary, may be utilized to enhance formation of the latex. Any suitable stirring device may be utilized. In embodiments, the stirring may be at from about 10 revolutions per minute (rpm) to about 5,000 rpm, in embodiments from about 20 rpm to about 2,000 rpm, in other embodiments from about 50 rpm to about 1,000 rpm. The stirring need not be at a constant speed, but may be varied. For example, as the heating of the mixture becomes more uniform, the stirring rate may be increased.

Emulsion Formation

Once the resin, neutralizing agent and surfactant are melt mixed, the mixture may then be contacted with water, to form a latex emulsion. Water may be added in order to form a latex with a solids content of from about 5% to about 50%, in embodiments, of from about 10% to about 40%. While higher water temperatures may accelerate the dissolution process, latexes can be formed at temperatures as low as room temperature. In other embodiments, water temperatures may be from about 40° C. to about 110° C., in embodiments, from about 50° C. to about 100° C.

Contact between the water and the resin mixture may be achieved in any suitable manner, such as in a vessel or continuous conduit, in a packed bed. In embodiments, a solvent free extruder process is utilized as shown in FIG. 1 as described in Example 1. In embodiments, as the resin mixture travels down the extruder, water may be added at three subsequent ports. This may be advantageous so that the transition from a water in oil to an oil in water emulsion may be gradual, ensuring that the materials continued to mix rather than phase separate, and to optimize emulsion formation in the extruder. In embodiments, the ports may inject preheated de-ionized water into the extruder at rates of from about 40 g/min to about 400 g/min, in embodiments, of from about 100 g/min to about 200 g/min.

The product exiting from the extruder may include a stream of latex that is collected in a steam traced tank with gentle agitation before being discharged for storage and later use in the aggregation/coalescence process described below.

The particle size of the latex emulsion formed can be controlled by the concentration ratio of surfactant and neutralizing agent to polyester resin. The solids concentration of the latex may be controlled by the ratio of the resin mixture to the water.

In accordance with the present disclosure, it has been found that the processes herein may produce emulsified resin particles that retain the same molecular weight properties of the starting resin, in embodiments, the pre-made resins utilized in forming the emulsion.

The emulsified resin particles in the aqueous medium may have a size of about 1500 nm or less, such as from about 10 nm to about 1200 nm, in embodiments from about 30 nm to about 1000 nm.

Particle size distribution of a latex of the present disclosure may be from about 60 nm to about 300 nm, in embodiments, from about 125 nm to about 200 nm.

The coarse content of the latex of the present disclosure may be from about 0.01% by weight to about 1% by weight, in embodiments, from about 0.1% by weight to about 0.5% by weight.

The solids content of the latex of the present disclosure may be from about 5% by weight to about 50% by weight, in embodiments, from about 30% by weight to about 40% by weight.

Following emulsification, additional surfactant, water, and/or neutralizing agent may optionally be added to dilute the emulsion, although this is not required. Following emulsification, the emulsion may be cooled to room temperature, for example from about 20° C. to about 25° C.

The latex emulsions of the present disclosure offer several advantages including, for example, low coarse content, tight particle size distributions and particle sizes appropriate for emulsion aggregation toner manufacturing; no homogenizers or other dispersing devices required for the preparation of latexes; no filtration to eliminate coarse particles; and latex production on demand from a convenient solid material.

The latex emulsions of the present disclosure may then be utilized to produce particle sizes that are suitable for emulsion aggregation ultra low melt processes, using crystalline and/or amorphous polyester resins. The latexes may be produced with a low coarse content without the use of homogenization or filtration.

Toner

Once the resin mixture has been contacted with water to form an emulsion as described above, the resulting latex may then be utilized to form a toner by any method within the purview of those skilled in the art. The latex emulsion may be contacted with a colorant, optionally in a dispersion, and other additives to form an ultra low melt toner by a suitable process, in embodiments, an emulsion aggregation and coalescence process.

In embodiments, the optional additional ingredients of a toner composition including colorant, wax, and other additives, may be added before, during or after melt mixing the resin to form the latex emulsion of the present disclosure. The additional ingredients may be added before, during or after formation of the latex emulsion. In further embodiments, the colorant may be added before the addition of the surfactant.

Colorants

As the colorant to be added, various known suitable colorants, such as dyes, pigments, mixtures of dyes, mixtures of pigments, mixtures of dyes and pigments, and the like, may be included in the toner. In embodiments, the colorant may be included in the toner in an amount of, for example, about 0.1 to about 35% by weight of the toner, or from about 1 to about 15% by weight of the toner, or from about 3 to about 10% by weight of the toner, although the amount of colorant can be outside of these ranges.

As examples of suitable colorants, mention may be made of carbon black like REGAL 330® (Cabot), Carbon Black 5250 and 5750 (Columbian Chemicals), Sunsperse Carbon Black LHD 9303 (Sun Chemicals); magnetites, such as Mobay magnetites MO8029™, MO8060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP-604™, NP-608™; Magnox magnetites TMB-100™, or TMB-104™; and the like. As colored pigments, there can be selected cyan, magenta, yellow, red, green, brown, blue or mixtures thereof. Generally, cyan, magenta, or yellow pigments or dyes, or mixtures thereof, are used. The pigment or pigments are generally used as water based pigment dispersions.

In general, suitable colorants may include Paliogen Violet 5100 and 5890 (BASF), Normandy Magenta RD-2400 (Paul Uhirich), Permanent Violet VT2645 (Paul Uhlrich), Heliogen Green L8730 (BASF), Argyle Green XP-111-S (Paul Uhlrich), Brilliant Green Toner GR 0991 (Paul Uhlrich), Lithol Scarlet D3700 (BASF), Toluidine Red (Aldrich), Scarlet for Thermoplast NSD PS PA (Ugine Kuhlmann of Canada), Lithol Rubine Toner (Paul Uhlrich), Lithol Scarlet 4440 (BASF), NBD 3700 (BASF), Bon Red C (Dominion Color), Royal Brilliant Red RD-8192 (Paul Uhlrich), Oracet Pink RF (Ciba Geigy), Paliogen Red 3340 and 3871K (BASF), Lithol Fast Scarlet L4300 (BASF), Heliogen Blue D6840, D7080, K7090, K6910 and L7020 (BASF), Sudan Blue OS (BASF), Neopen Blue FF4012 (BASF), PV Fast Blue B2G01 (American Hoechst), Irgalite Blue BCA (Ciba Geigy), Paliogen Blue 6470 (BASF), Sudan II, III and IV (Matheson, Coleman, Bell), Sudan Orange (Aldrich), Sudan Orange 220 (BASF), Paliogen Orange 3040 (BASF), Ortho Orange OR 2673 (Paul Uhlrich), Paliogen Yellow 152 and 1560 (BASF), Lithol Fast Yellow 0991K (BASF), Paliotol Yellow 1840 (BASF), Novaperm Yellow FGL (Hoechst), Permanerit Yellow YE 0305 (Paul Uhlrich), Lumogen Yellow D0790 (BASF), Sunsperse Yellow YHD 6001 (Sun Chemicals), Suco-Gelb 1250 (BASF), Suco-Yellow D1355 (BASF), Suco Fast Yellow D1165, D1355 and D1351 (BASF), Hostaperm Pink E™ (Hoechst), Fanal Pink D4830 (BASF), Cinquasia Magenta™ (DuPont), Paliogen Black L9984 (BASF), Pigment Black K801 (BASF), Levanyl Black A-SF (Miles, Bayer), combinations of the foregoing, and the like.

Other suitable water based colorant dispersions include those commercially available from Clariant, for example, Hostafine Yellow GR, Hostafine Black T and Black TS, Hostafine Blue B2G, Hostafine Rubine F6B and magenta dry pigment such as Toner Magenta 6BVP2213 and Toner Magenta EO2 which may be dispersed in water and/or surfactant prior to use.

Specific examples of pigments include Sunsperse BHD 6011X (Blue 15 Type), Sunsperse BHD 9312X (Pigment Blue 15 74160), Sunsperse BHD 6000X (Pigment Blue 15:3 74160), Sunsperse GHD 9600X and GHD 6004X (Pigment Green 7 74260), Sunsperse QHD 6040X (Pigment Red 122 73915), Sunsperse RHD 9668X (Pigment Red 185 12516), Sunsperse RHD 9365X and 9504X (Pigment Red 57 15850:1, Sunsperse YHD 6005X (Pigment Yellow 83 21108), Flexiverse YFD 4249 (Pigment Yellow 17 21105), Sunsperse YHD 6020X and 6045X (Pigment Yellow 74 11741), Sunsperse YHD 600X and 9604X (Pigment Yellow 14 21095), Flexiverse LFD 4343 and LFD 9736 (Pigment Black 7 77226), Aquatone, combinations thereof, and the like, as water based pigment dispersions from Sun Chemicals, Heliogen Blue L6900, D6840™, D7080™, D7020™, Pylam Oil Blue™, Pylam Oil Yellow™, Pigment Blue 1™ available from Paul Uhlich & Company, Inc., Pigment Violet 1™, Pigment Red 48™, Lemon Chrome Yellow DCC 1026™, E.D. Toluidine Red™ and Bon Red C™ available from Dominion Color Corporation, Ltd., Toronto, Ontario, Novaperm Yellow FGL™, and the like. Generally, colorants that can be selected are black, cyan, magenta, or yellow, and mixtures thereof. Examples of magentas are 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyans include copper tetra(octadecyl sulfonarnido) phthalocyanine, x-copper phthalocyanine pigment listed in the Color Index as CI 74160, CI Pigment Blue, Pigment Blue 15:3, and Anthrathrene Blue, identified in the Color Index as CI 69810, Special Blue X-2137, and the like. Illustrative examples of yellows are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL.

In embodiments, the colorant may include a pigment, a dye, combinations thereof, carbon black, magnetite, black, cyan, magenta, yellow, red, green, blue, brown, combinations thereof, in an amount sufficient to impart the desired color to the toner. It is to be understood that other useful colorants will become readily apparent based on the present disclosures.

In embodiments, a pigment or colorant may be employed in an amount of from about 1% by weight to about 35% by weight of the toner particles on a solids basis, in other embodiments, from about 5% by weight to about 25% by weight. However, amounts outside these ranges can also be used, in embodiments.

Wax

Optionally, a wax may also be combined with the resin and a colorant in forming toner particles. The wax may be provided in a wax dispersion, which may include a single type of wax or a mixture of two or more different waxes. A single wax may be added to toner formulations, for example, to improve particular toner properties, such as toner particle shape, presence and amount of wax on the toner particle surface, charging and/or fusing characteristics, gloss, stripping, offset properties, and the like. Alternatively, a combination of waxes can be added to provide multiple properties to the toner composition.

When included, the wax may be present in an amount of, for example, from about 1% by weight to about 25% by weight of the toner particles, in embodiments from about 5% by weight to about 20% by weight of the toner particles, although the amount of wax can be outside of these ranges.

When a wax dispersion is used, the wax dispersion may include any of the various waxes conventionally used in emulsion aggregation toner compositions. Waxes that may be selected include waxes having, for example, an average molecular weight of from about 500 to about 20,000, in embodiments from about 1,000 to about 10,000. Waxes that may be used include, for example, polyolefins such as polyethylene including linear polyethylene waxes and branched polyethylene waxes, polypropylene including linear polypropylene waxes and branched polypropylene waxes, polyethylene/amide, polyethylenetetrafluoroethylene, polyethylenetetrafluoroethylene/amide, and polybutene waxes such as commercially available from Allied Chemical and Petrolite Corporation, for example POLYWAX™ polyethylene waxes such as commercially available from Baker Petrolite, wax emulsions available from Michaelman, Inc. and the Daniels Products Company, EPOLENE N-15™ commercially available from Eastman Chemical Products, Inc., and VISCOL 550-P™, a low weight average molecular weight polypropylene available from Sanyo Kasei K. K.; plant-based waxes, such as carnauba wax, rice wax, candelilla wax, sumacs wax, and jojoba oil; animal-based waxes, such as beeswax; mineral-based waxes and petroleum-based waxes, such as montan wax, ozokerite, ceresin, paraffin wax, microcrystalline wax such as waxes derived from distillation of crude oil, silicone waxes, mercapto waxes, polyester waxes, urethane waxes; modified polyolefin waxes (such as a carboxylic acid-terminated polyethylene wax or a carboxylic acid-terminated polypropylene wax); Fischer-Tropsch wax; ester waxes obtained from higher fatty acid and higher alcohol, such as stearyl stearate and behenyl behenate; ester waxes obtained from higher fatty acid and monovalent or multivalent lower alcohol, such as butyl stearate, propyl oleate, glyceride monostearate, glyceride distearate, and pentaerythritol tetra behenate; ester waxes obtained from higher fatty acid and multivalent alcohol multimers, such as diethyleneglycol monostearate, dipropyleneglycol distearate, diglyceryl distearate, and triglyceryl tetrastearate; sorbitan higher fatty acid ester waxes, such as sorbitan monostearate, and cholesterol higher fatty acid ester waxes, such as cholesteryl stearate. Examples of functionalized waxes that may be used include, for example, amines, amides, for example AQUA SUPERSLIP 6550™, SUPERSLIP 6530™ available from Micro Powder Inc., fluorinated waxes, for example POLYFLUO 190™, POLYFLUO 200™, POLYSILK 19™, POLYSILK 14™ available from Micro Powder Inc., mixed fluorinated, amide waxes, such as aliphatic polar amide functionalized waxes; aliphatic waxes consisting of esters of hydroxylated unsaturated fatty acids, for example MICROSPERSION 19™ also available from Micro Powder Inc., imides, esters, quaternary amines, carboxylic acids or acrylic polymer emulsion, for example JONCRYL 74™, 89™, 130™, 537™, and 538™, all available from SC Johnson Wax, and chlorinated polypropylenes and polyethylenes available from Allied Chemical and Petrolite Corporation and SC Johnson wax. Mixtures and combinations of the foregoing waxes may also be used in embodiments. Waxes may be included as, for example, fuser roll release agents. In embodiments, the waxes may be crystalline or non-crystalline.

In embodiments, the wax may be incorporated into the toner in the form of one or more aqueous emulsions or dispersions of solid wax in water, where the solid wax particle size may be in the range of from about 100 to about 300 nm.

Toner Preparation

The toner particles may be prepared by any method within the purview of one skilled in the art. Although embodiments relating to toner particle production are described below with respect to emulsion aggregation processes, any suitable method of preparing toner particles may be used, including chemical processes, such as suspension and encapsulation processes disclosed in U.S. Pat. Nos. 5,290,654 and 5,302,486, the disclosures of each of which are hereby incorporated by reference in their entirety. In embodiments, toner compositions and toner particles may be prepared by aggregation and coalescence processes in which small-size resin particles are aggregated to the appropriate toner particle size and then coalesced to achieve the final toner particle shape and morphology.

In embodiments, toner compositions may be prepared by emulsion aggregation processes, such as a process that includes aggregating a mixture of an optional colorant, an optional wax and any other desired or required additives, and emulsions including the resins described above, optionally in surfactants as described above, and then coalescing the aggregate mixture. A mixture may be prepared by adding a colorant and optionally a wax or other materials, which may also be optionally in a dispersion(s) including a surfactant, to the emulsion, which may be a mixture of two or more emulsions containing the resin. The pH of the resulting mixture may be adjusted by an acid such as, for example, acetic acid, nitric acid or the like. In embodiments, the pH of the mixture may be adjusted to from about 2 to about 5. Additionally, in embodiments, the mixture may be homogenized. If the mixture is homogenized, homogenization may be accomplished by mixing at about 600 to about 6,000 revolutions per minute. Homogenization may be accomplished by any suitable means, including, for example, an IKA ULTRA TURRAX T50 probe homogenizer.

Following the preparation of the above mixture, an aggregating agent may be added to the mixture. Any suitable aggregating agent may be utilized to form a toner. Suitable aggregating agents include, for example, aqueous solutions of a divalent cation or a multivalent cation material. The aggregating agent may be, for example, an inorganic cationic aggregating agent such as polyaluminum halides such as polyaluminum chloride (PAC), or the corresponding bromide, fluoride, or iodide, polyaluminum silicates such as polyaluminum sulfosilicate (PASS), and water soluble metal salts including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate, and combinations thereof In embodiments, the aggregating agent may be added to the mixture at a temperature that is below the glass transition temperature (Tg) of the resin.

Suitable examples of organic cationic aggregating agents include, for example, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, combinations thereof, and the like.

Other suitable aggregating agents also include, but are not limited to, tetraalkyl titinates, dialkyltin oxide, tetraalkyltin oxide hydroxide, dialkyltin oxide hydroxide, aluminum alkoxides, alkylzinc, dialkyl zinc, zinc oxides, stannous oxide, dibutyltin oxide, dibutyltin oxide hydroxide, tetraalkyl tin, combinations thereof, and the like. Where the aggregating agent is a polyion aggregating agent, the agent may have any desired number of polyion atoms present. For example, in embodiments, suitable polyaluminum compounds have from about 2 to about 13, in other embodiments, from about 3 to about 8, aluminum ions present in the compound.

The aggregating agent may be added to the mixture utilized to form a toner in an amount of, for example, from about 0% to about 10% by weight, in embodiments from about 0.2% to about 8% by weight, in other embodiments from about 0.5% to about 5% by weight, of the resin in the mixture. This should provide a sufficient amount of agent for aggregation.

The particles may be permitted to aggregate until a predetermined desired particle size is obtained. A predetermined desired size refers to the desired particle size to be obtained as determined prior to formation, and the particle size being monitored during the growth process until such particle size is reached. Samples may be taken during the growth process and analyzed, for example with a Coulter Counter, for average particle size. The aggregation thus may proceed by maintaining the elevated temperature, or slowly raising the temperature to, for example, from about 40° C. to about 100° C., and holding the mixture at this temperature for a time of from about 0.5 hours to about 6 hours, in embodiments from about hour 1 to about 5 hours, while maintaining stirring, to provide the aggregated particles. Once the predetermined desired particle size is reached, then the growth process is halted.

The growth and shaping of the particles following addition of the aggregation agent may be accomplished under any suitable conditions. For example, the growth and shaping may be conducted under conditions in which aggregation occurs separate from coalescence. For separate aggregation and coalescence stages, the aggregation process may be conducted under shearing conditions at an elevated temperature, for example of from about 40° C. to about 90° C., in embodiments from about 45° C. to about 80° C., which may be below the glass transition temperature of the resin as discussed above.

Once the desired final size of the toner particles is achieved, the pH of the mixture may be adjusted with a base to a value of from about 3 to about 10, and in embodiments from about 5 to about 9. The adjustment of the pH may be utilized to freeze, that is to stop, toner growth. The base utilized to stop toner growth may include any suitable base such as, for example, alkali metal hydroxides such as, for example, sodium hydroxide, potassium hydroxide, ammonium hydroxide, combinations thereof, and the like. In embodiments, ethylene diamine tetraacetic acid (EDTA) may be added to help adjust the pH to the desired values noted above.

Shell Resin

In embodiments, after aggregation, but prior to coalescence, a resin coating may be applied to the aggregated particles to form a shell thereover. Any resin described above may be utilized as the shell. In embodiments, a polyester amorpohous resin latex as described above may be included in the shell. In yet other embodiments, the polyester amorphous resin latex described above may be combined with a different resin, and then added to the particles as a resin coating to form a shell.

In embodiments, resins which may be utilized to form a shell include, but are not limited to, a crystalline resin latex described above, and/or the amorphous resins described above. In embodiments, an amorphous resin which may be utilized to form a shell in accordance with the present disclosure includes an amorphous polyester, optionally in combination with a crystalline polyester resin latex described above. Multiple resins may be utilized in any suitable amounts. In embodiments, a first amorphous polyester resin, for example an amorphous resin of formula I above, may be present in an amount of from about 20 percent by weight to about 100 percent by weight of the total shell resin, in embodiments from about 30 percent by weight to about 90 percent by weight of the total shell resin. Thus, in embodiments, a second resin may be present in the shell resin in an amount of from about 0 percent by weight to about 80 percent by weight of the total shell resin, in embodiments from about 10 percent by weight to about 70 percent by weight of the shell resin.

The shell resin may be applied to the aggregated particles by any method within the purview of those skilled in the art. In embodiments, the resins utilized to form the shell may be in an emulsion including any surfactant described above. The emulsion possessing the resins, optionally the solvent free crystalline polyester resin latex neutralized with NaOH flakes described above, may be combined with the aggregated particles described above so that the shell forms over the aggregated particles.

The formation of the shell over the aggregated particles may occur while heating to a temperature of from about 30° C. to about 80° C., in embodiments from about 35° C. to about 70° C. The formation of the shell may take place for a period of time of from about 5 minutes to about 10 hours, in embodiments from about 10 minutes to about 5 hours.

Coalescence

Following aggregation to the desired particle size and application of any optional shell, the particles may then be coalesced to the desired final shape, the coalescence being achieved by, for example, heating the mixture to a temperature of from about 45° C. to about 100° C., in embodiments from about 55° C. to about 99° C., which may be at or above the glass transition temperature of the resins utilized to form the toner particles, and/or reducing the stirring, for example to from about 100 rpm to about 1,000 rpm, in embodiments from about 200 rpm to about 800 rpm. Coalescence may be accomplished over a period of from about 0.01 to about 9 hours, in embodiments from about 0.1 to about 4 hours.

After aggregation and/or coalescence, the mixture may be cooled to room temperature, such as from about 20° C. to about 25° C. The cooling may be rapid or slow, as desired. A suitable cooling method may include introducing cold water to a jacket around the reactor. After cooling, the toner particles may be optionally washed with water, and then dried. Drying may be accomplished by any suitable method for drying including, for example, freeze-drying.

Additives

In embodiments, the toner particles may also contain other optional additives, as desired or required. For example, the toner may include positive or negative charge control agents, for example in an amount of from about 0.1 to about 10% by weight of the toner, in embodiments from about 1 to about 3% by weight of the toner. Examples of suitable charge control agents include quaternary ammonium compounds inclusive of alkyl pyridinium halides; bisulfates; alkyl pyridinium compounds, including those disclosed in U.S. Pat. No. 4,298,672, the disclosure of which is hereby incorporated by reference in its entirety; organic sulfate and sulfonate compositions, including those disclosed in U.S. Pat. No. 4,338,390, the disclosure of which is hereby incorporated by reference in its entirety; cetyl pyridinium tetrafluoroborates; distearyl dimethyl ammonium methyl sulfate; aluminum salts such as BONTRON E84™ or E88™ (Orient Chemical Industries, Ltd.); combinations thereof, and the like.

There can also be blended with the toner particles external additive particles after formation including flow aid additives, which additives may be present on the surface of the toner particles. Examples of these additives include metal oxides such as titanium oxide, silicon oxide, aluminum oxides, cerium oxides, tin oxide, mixtures thereof, and the like; colloidal and amorphous silicas, such as AEROSIL®, metal salts and metal salts of fatty acids inclusive of zinc stearate, calcium stearate, or long chain alcohols such as UNILIN 700, and mixtures thereof.

In general, silica may be applied to the toner surface for toner flow, tribo enhancement, admix control, improved development and transfer stability, and higher toner blocking temperature. $TiO_2$ may be applied for improved relative humidity (RH) stability, tribo control and improved development and transfer stability. Zinc stearate, calcium stearate and/or magnesium stearate may optionally also be used as an external additive for providing lubricating properties, developer conductivity, tribo enhancement, enabling higher toner charge and charge stability by increasing the number of contacts between toner and carrier particles. In embodiments, a commercially available zinc stearate known as Zinc Stearate L, obtained from Ferro Corporation, may be used. The external surface additives may be used with or without a coating.

Each of these external additives may be present in an amount of from about 0.1% by weight to about 5% by weight of the toner, in embodiments of from about 0.25% by weight to about 3% by weight of the toner, although the amount of additives can be outside of these ranges. In embodiments, the toners may include, for example, from about 0.1% by weight to about 5% by weight titania, from about 0.1% by weight to about 8% by weight silica, and from about 0.1% by weight to about 4% by weight zinc stearate.

Suitable additives include those disclosed in U.S. Pat. Nos. 3,590,000, 3,800,588, and 6,214,507, the disclosures of each of which are hereby incorporated by reference in their entirety.

The following Examples are being submitted to illustrate embodiments of the present disclosure. These Examples are intended to be illustrative only and are not intended to limit the scope of the present disclosure. Also, parts and percentages are by weight unless otherwise indicated. As used herein, "room temperature" refers to a temperature of from about 20° C. to about 25° C.

EXAMPLES

Example 1

Solvent-free emulsification of a crystalline polyester resin via extrusion utilizing NaOH flakes and DOWFAX™ 2A1, an alkyldiphenyloxide disulfonate from the Dow Chemical Company.

An extruder, as depicted in FIG. 1, equipped with a feed hopper and liquid injection ports was preheated to about 95° C. and set to a rotor speed of about 450 rpm. About 64.6 grams of NaOH flakes and about 6.46 kilograms of a poly(nonylene-decanoate) crystalline polyester resin was mixed in tumbler 10 for about 15 minutes at a rotor speed of about 15 rpm to prepare a pre-blend mixture. This pre-blend mixture was loaded into the hopper of screw feeder 20 which delivered about 380 g/min of the mixture to the extruder 30. As the material traveled down the screw feeder and melted, about 20% solids content of DOWFAX™ 2A1, preheated to a temperature of about 55° C., was fed to the extruder's first injection port 70 at a feed rate of about 162 g/min from vessel 40 via a diaphragm pump 50 and heated via heat exchanger 60. The water in this solution activated the NaOH while the surfactant it carried was melt mixed with the resin to produce a homogeneous mixture of neutralized resin.

As the mixture traveled down the extruder, preheated deionized (DIW) water was added at three subsequent ports. DIW, from tank 80, was fed to the extruder's second injection port 110, third injection port 140, fourth injection port 170, at feed rates of about 161 g/min, about 153 g/min, and about 110 g/min, respectively, via diaphragm pumps 90, 120, and 150, respectively, and heated via heat exchangers 100, 130, and 160, respectively. The addition of water provided gradual transition from a water in oil to an oil in water emulsion ensuring that the materials continued to mix rather than phase separate.

The product collected from the extruder included a stream of latex that was collected in a steam traced tank 200 with gentle agitation with additional DIW fed from tank 80 at a feed rate of 16 g/min via diaphragm pump 180 and heated via heat exchanger 190.

Figure 2:
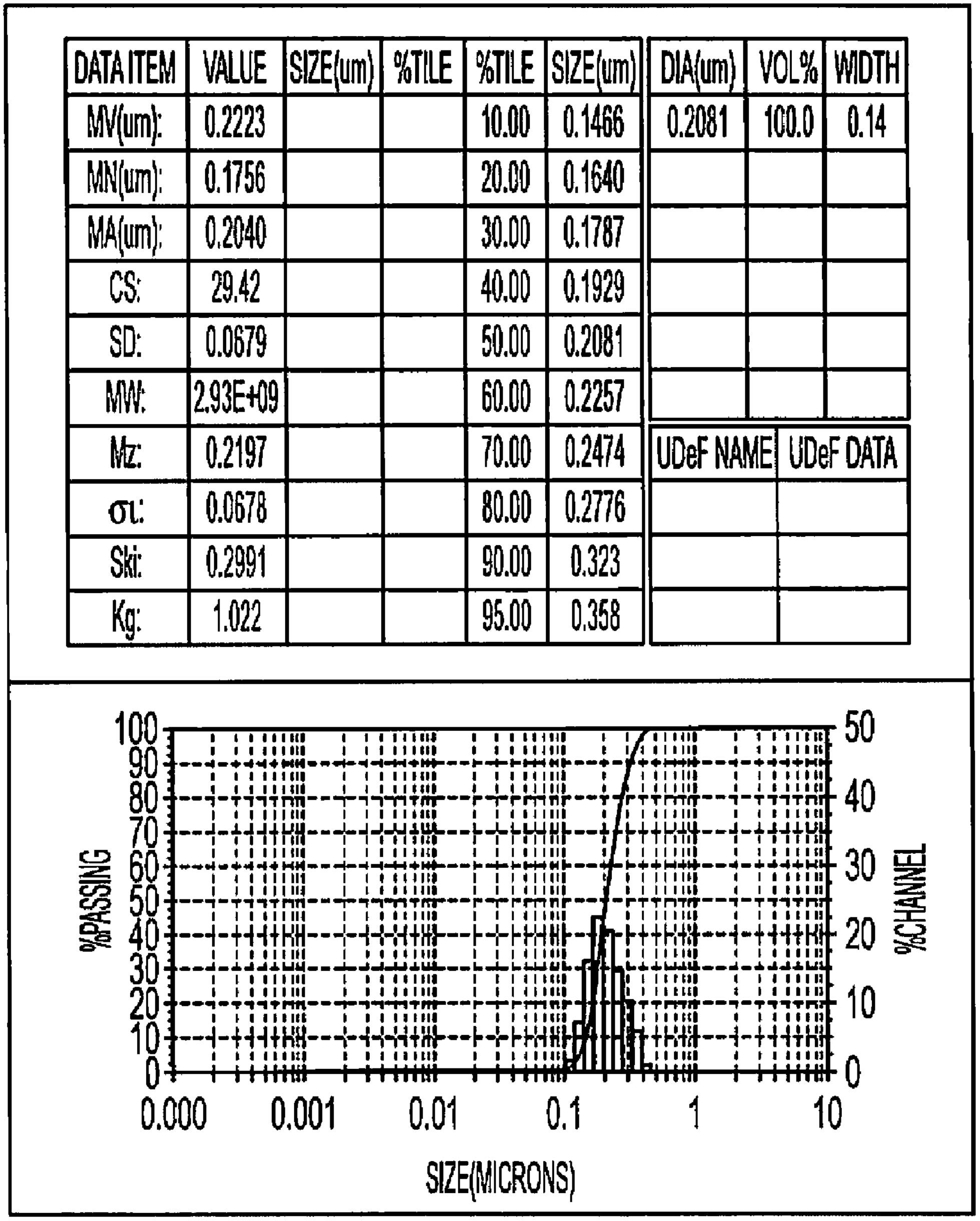
FIG. 2 is a graph depicting particle size distribution for the latex in accordance with Example 1 of the present disclosure.

A sample from the latex stream 210 collected at about 950 g/min was taken and filtered through a 25 μm filter to determine the coarse content, solids content, particle size, particle size distribution, and resin molecular weight of the latex. The coarse content was about 0.4%, the solids content was about 39.7%, the particle size was about 208 nm with a narrow particle size distribution, as shown in FIG. 2, and the resin in the latex did not degrade in molecular weight. The dried latex resin weight average molecular weight was 21,400 Da whereas the starting material had a molecular weight of 21,300 Da (the difference within measurement error). The solids content of the emulsion was controlled by the ratio of resin mixture to DIW. The latex emulsion was then used in an aggregation/coalescence process.

Example 2

Solvent-free emulsification of a crystalline polyester resin via extrusion utilizing NaOH flakes and sodium dodecylbenzene sulfonate flakes.

Figure 3:
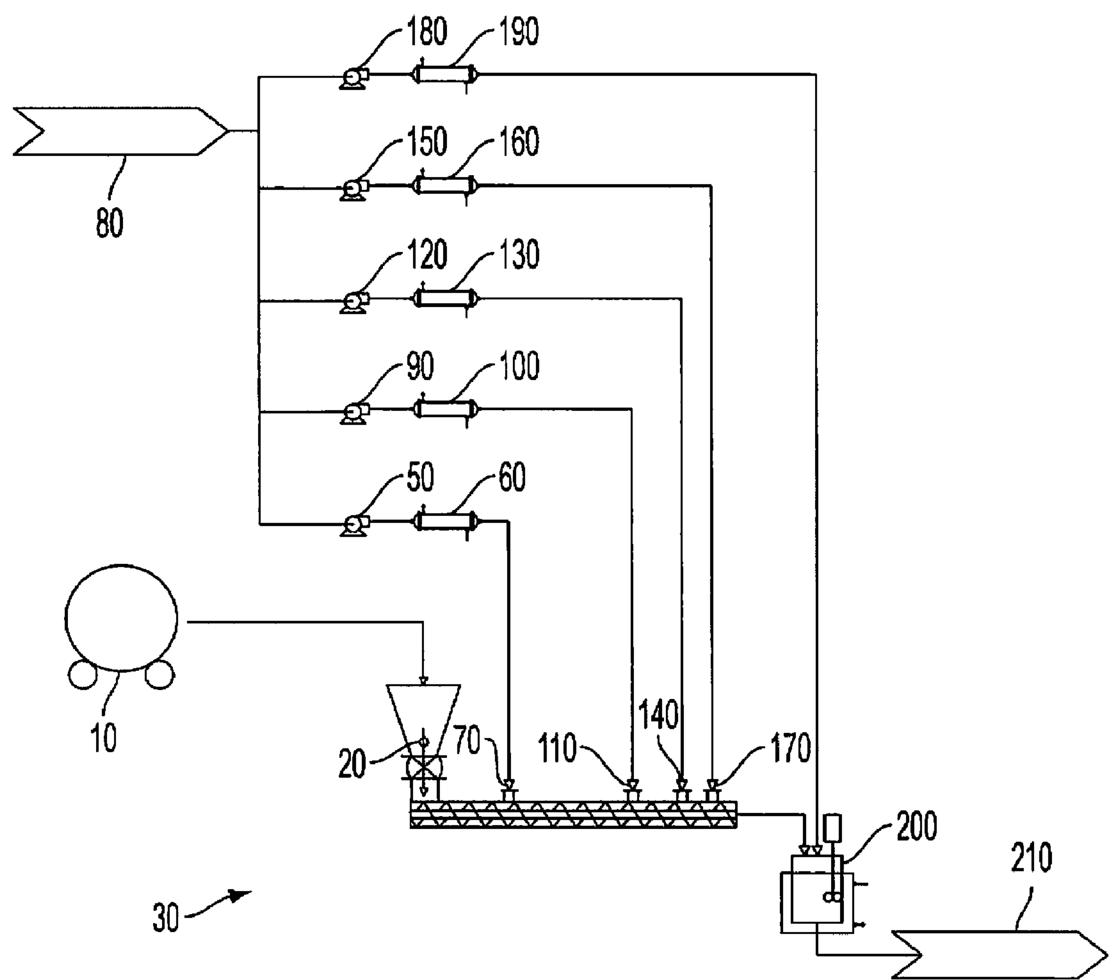
FIG. 3 is a flow chart depicting an extruder process for the preparation of a polyester latex in accordance with Example 2 of the present disclosure.

An extruder, as depicted in FIG. 3, equipped with a feed hopper and liquid injection ports was preheated to about 100° C. and set to a rotor speed of about 450 rpm. About 64.6 grams of NaOH flakes, about 485 grams of sodium dodecylbenzene sulfonate (SDBS), and about 6.46 kilograms of a poly(nonylene-decanoate)crystalline polyester resin was mixed in tumbler 10 for about 15 minutes at a rotor speed of about 15 rpm to prepare a pre-blend mixture. This pre-blend mixture was loaded into the hopper of a screw feeder 20 which delivered about 380 g/min of the mixture to the extruder 30 as illustrated in FIG. 3. As the material traveled down the screw feeder and melted, preheated DIW from tank 80 was fed to the extruder's first injection port 70 at a feed rate of about 120 g/min via a diaphragm pump 50 and heated via heat exchanger 60. The water in this solution activated the NaOH and surfactant to produce a homogeneous mixture of neutralized resin.

As the mixture traveled down the extruder, preheated DIW water was added at three subsequent ports. DIW, from tank 30, was fed to the extruder's second injection port 110, third injection port 140, and fourth injection port 170, at feed rates of about 180 g/min, about 190 g/min, and about 110 g/min, respectively, via diaphragm pumps 90, 120, and 150, respectively, and heated via heat exchangers 100, 130, and 160, respectively. The addition of water at these rates provided a gradual transition from a water in oil to an oil in water emulsion ensuring that the materials continued to mix rather than phase separate.

The product collected from the extruder included a stream of latex that was collected in a steam traced tank 200 with gentle agitation with additional DIW fed from tank 80 at a feed rate of 180 g/min via diaphragm pump 180 and heated via heat exchanger 190.

Figure 4:
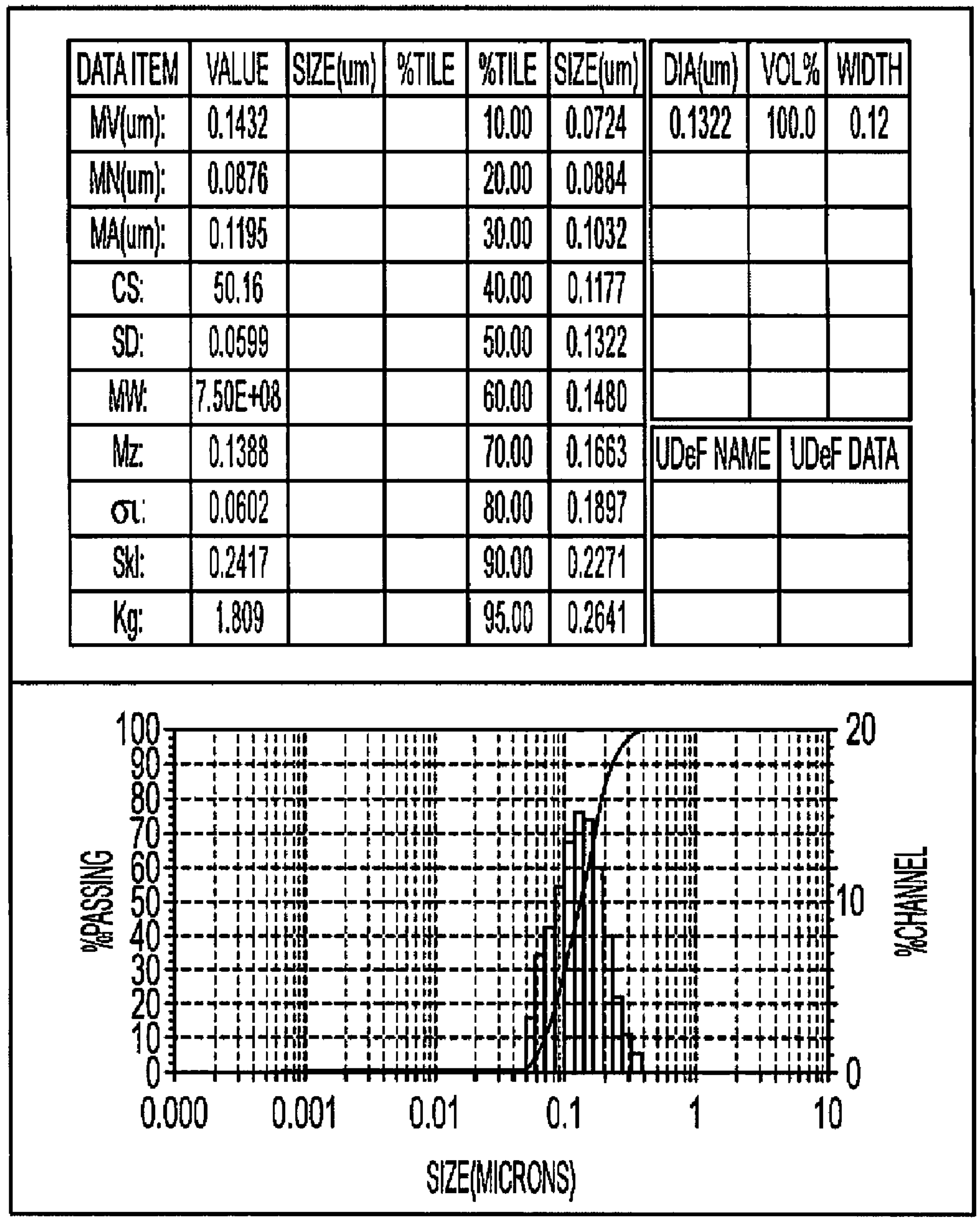
FIG. 4 is a graph depicting particle size distribution for the latex in accordance with Example 2 of the present disclosure.

A sample from the latex stream 210 collected at about 1180 g/min was taken and filtered through a 25 μm filter to determine the coarse content, solids content, particle size, particle size distribution, and resin molecular weight of the latex. The coarse content was about 0.1%, the solids content was about 32.8%, the particle size was about 132 nm with a narrow particle size distribution as shown in FIG. 4, and the resin in the latex did not degrade in molecular weight. The dried latex resin weight average molecular weight was 20,000 Da, whereas the starting material had a molecular weight of 21,300 Da (the difference within measurement error).

Example 3

Solvent-free emulsification of an amorphous polyester resin via extrusion utilizing NaOH flakes and DOWFAX™ 2A1.

Figure 5:
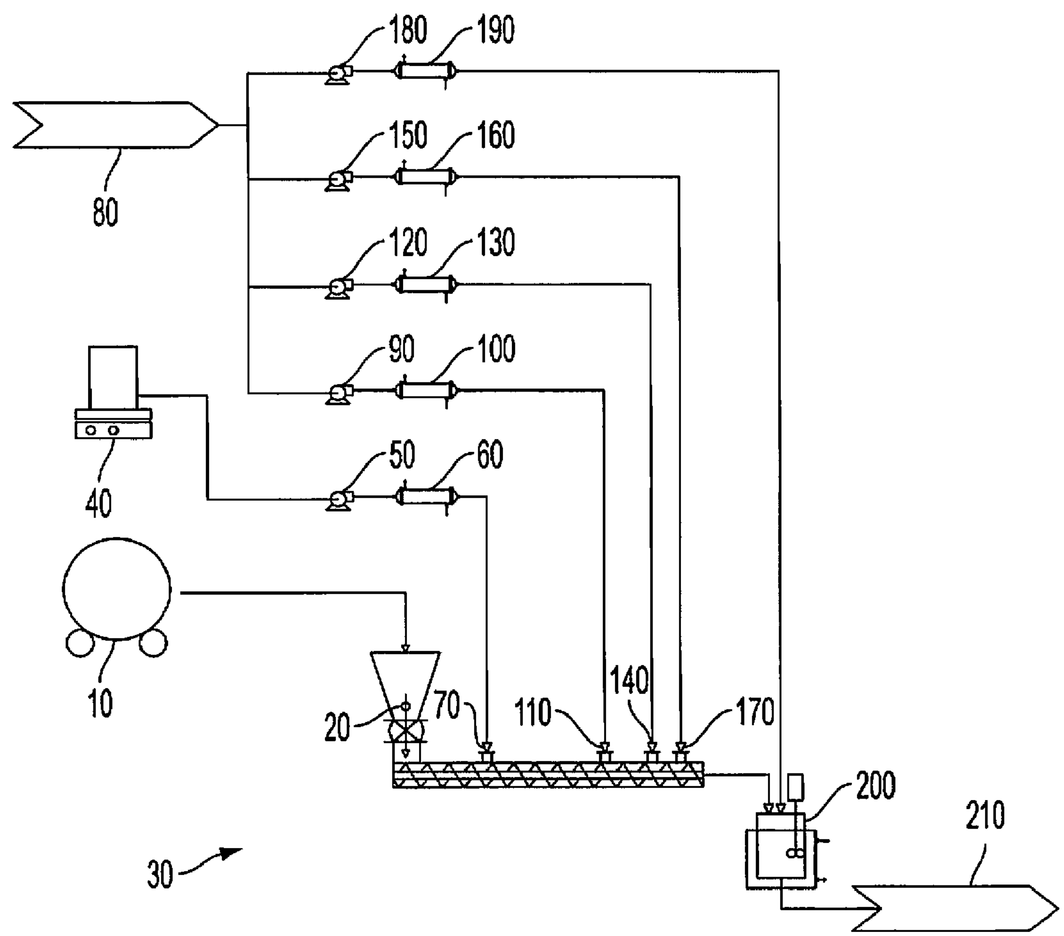
FIG. 5 is a flow chart depicting an extruder process for the preparation of a polyester latex in accordance with Example 3 of the present disclosure.

An extruder, as depicted in FIG. 5, equipped with a feed hopper and liquid injection ports was preheated to about 100° C. and set to a rotor speed of about 450 rpm. About 38.8 grams of NaOH flakes and about 6.46 kilograms of a poly(co-propoxylated bisphenol co-ethoxylated bisphenol co-terephthalate) polyester amorphous resin was mixed in tumbler 10 for about 15 minutes at a rotor speed of about 15 rpm to prepare a pre-blend mixture. This pre-blend mixture was loaded into the hopper of a screw feeder 20 which delivered about 350 g/min of the mixture to the extruder 30 as illustrated in FIG. 5. As the material traveled down the screw feeder and melted, about 25% solids content of DOWFAX™ 2A1, preheated to a temperature of about 55° C., was fed to the extruder's first injection port 70 at a feed rate of about 82 g/min from vessel 40 via a diaphragm pump 50 and heated via heat exchanger 60. The water in this solution activated the NaOH, while the surfactant melt mixed with the resin to produce a homogeneous mixture of neutralized resin.

As the mixture traveled down the extruder, preheated DIW water was added at three subsequent ports. DIW, from tank 30, was fed to the extruder's second injection port 110, third injection port 140, and fourth injection port 170, at feed rates of about 89 g/min, about 190 g/min, and about 110 g/min, respectively, via diaphragm pumps 90, 120, and 150, respectively, and heated via heat exchangers 100, 130, and 160, respectively. The addition of water at these rates provided for a gradual transition from a water in oil to an oil in water emulsion ensuring that the materials continued to mix rather than phase separate.

The product collected from the extruder included a stream of latex that was collected in a steam traced tank 200 with gentle agitation with additional DIW fed from tank 80 at a feed rate of 81 g/min via diaphragm pump 180 and heated via heat exchanger 190.

Figure 6:
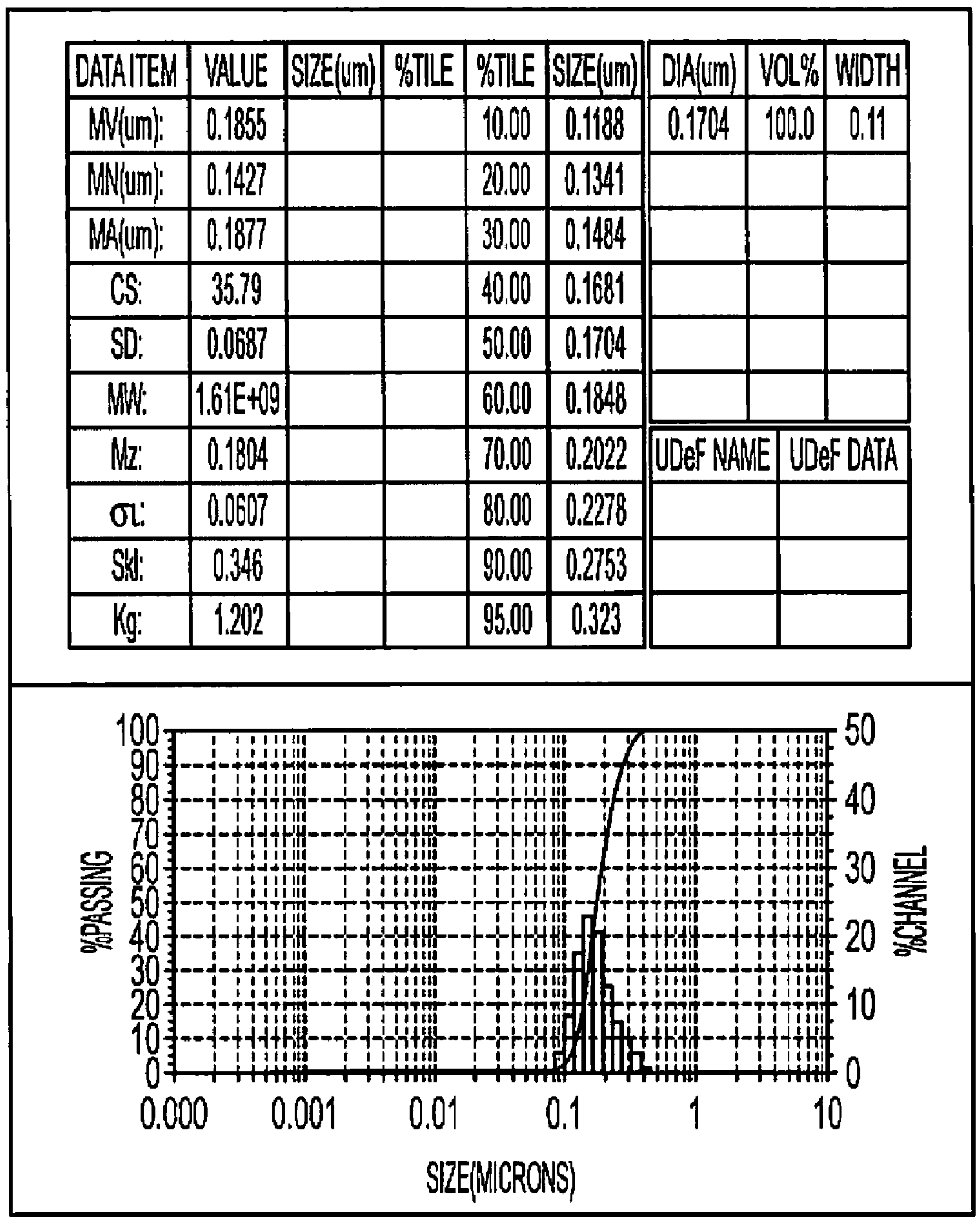
FIG. 6 is a graph depicting particle size distribution for the latex in accordance with Example 3 of the present disclosure.

A sample from the latex stream 210 collected at about 880 g/min was taken and filtered through a 25 μm filter to determine the coarse content, solids content, particle size, particle size distribution, and resin molecular weight of the latex. The coarse content was about 0.2%, the solids content was about 39.7%, the particle size was about 170 nm with a narrow particle size distribution as shown in FIG. 6, and the resin in the latex did not degrade in molecular weight. The dried latex resin weight average molecular weight was 19,100 Da whereas the starting material had a molecular weight of 18,600 Da (the difference within measurement error).

Example 4

Solvent-free emulsification of a crystalline polyester resin via co-feeding extrusion process utilizing NaOH flakes and DOWFAX™ 2A1.

Figure 7:
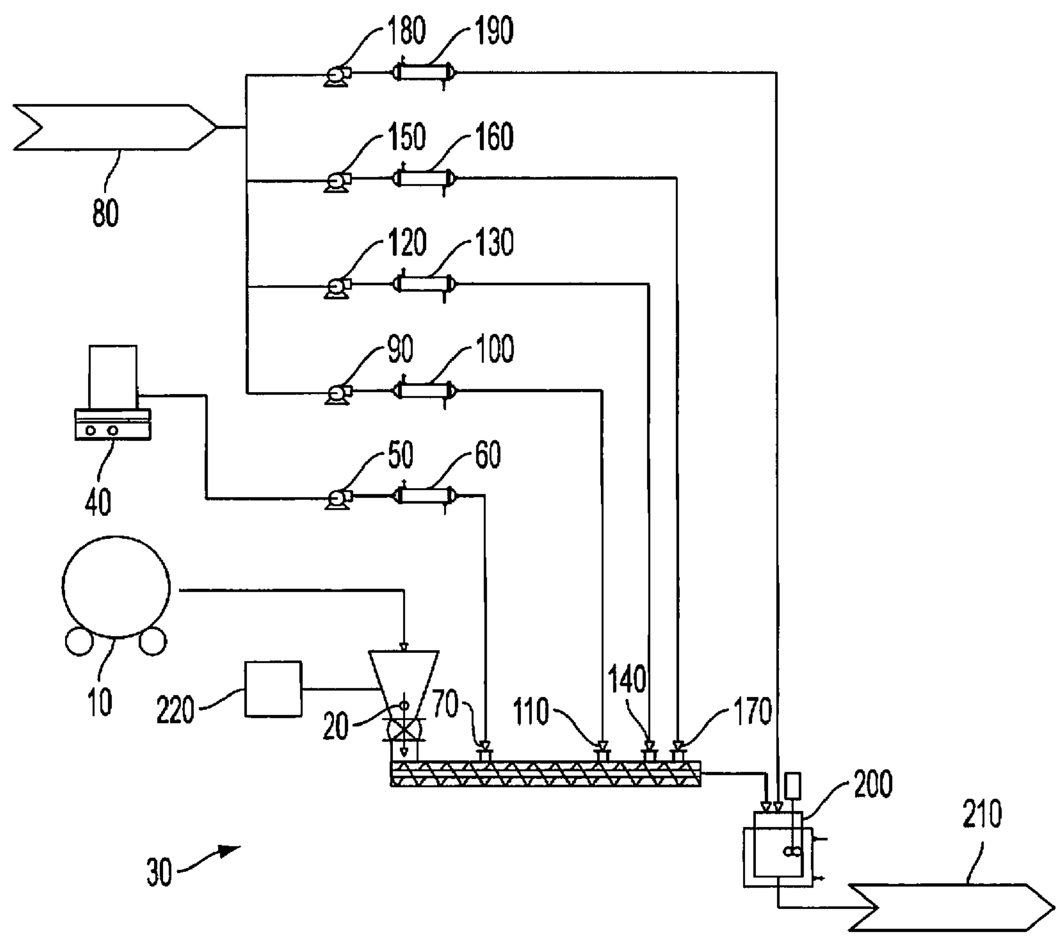
FIG. 7 is a flow chart depicting an extruder process for the preparation of a polyester latex in accordance with another embodiment of the present disclosure.

An extruder, as depicted in FIG. 7, equipped with a feed hopper and liquid injection ports was preheated to about 95° C. and set to a rotor speed of about 450 rpm. NaOH flakes fed from vessel 220 was co-fed simultaneously at a rate of about 9 g/min with about 760 g/min of a poly(nonylene-decanoate) crystalline polyester resin fed from screw feeder 20 which delivered about 769 g/min of the mixture to the extruder 30 as illustrated in FIG. 7. As the material traveled down the screw feeder and melted, about 25% solids content of DOWFAX™ 2A1, preheated to a temperature of about 55° C., was fed to the extruder's first injection port 70 at a feed rate of about 301 g/min from vessel 40 via a diaphragm pump 50 and heated via heat exchanger. The water in this solution activated the NaOH while the surfactant it carried was melt mixed with the resin to produce a homogeneous mixture of neutralized resin.

As the mixture traveled down the extruder, preheated deionized (DIW) water was added at three subsequent ports. DIW, from tank 80, was fed to the extruder's second injection port 110, third injection port 140, and fourth injection port 170, at feed rates of about 160 g/min, about 226 g/min, and about 110 g/min, respectively, via diaphragm pumps 90, 120, and 150, respectively, and heated via heat exchangers 100, 130, and 160, respectively. The additional water provided for a gradual transition from a water in oil to an oil in water emulsion ensuring that the materials continued to mix rather than phase separate.

The product collected from the extruder included a stream of latex that was collected in a steam traced tank 200 with gentle agitation with additional DIW fed from tank 80 at a feed rate of 1067 g/min via diaphragm pump 180 and heated via heat exchanger 190.

A sample from the latex stream 210 collected at about 2630 g/min was taken and filtered through a 25 μm filter to determine the coarse content, solids content, particle size, particle size distribution, and resin molecular weight of the latex. The coarse content was less than about 0.1%, the solids content was about 35%, the particle size was about 154 nm with a narrow particle size distribution, and the resin in the latex did not degrade in molecular weight. The latex emulsion was then used in the aggregation/coalescence process.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A process comprising:

contacting at least one polyester resin with a solid neutralizing agent selected from the group consisting of ammonium hydroxide flakes, potassium hydroxide flakes, sodium hydroxide flakes, sodium carbonate flakes, sodium bicarbonate flakes, lithium hydroxide flakes, potassium carbonate flakes, organoamines, and combinations thereof, in the absence of an organic solvent to form a pre-blend mixture;

contacting the pre-blend mixture with a surfactant;

melt mixing the mixture;

contacting the melt mixed mixture with de-ionized water to form an oil in water emulsion; and continuously recovering latex particles.

2. A process according to claim 1, wherein the polyester resin is selected from the group consisting of amorphous resins, crystalline resins, and combinations thereof.

3. A process according to claim 1, wherein the surfactant is selected from the group consisting of sodium dodecylsulfates, sodium dodecylbenzene sulfonates, sodium dodecyinaphthalene sulfate, dialkyl benzenealkyl sulfates, dialkyl benzenealkyl sulfonates, abitic acid, alkyl diphenyloxide disulfonates, branched sodium dodecyl benzene sulfonates, polyvinyl alcohol, polyacrylic acid, methalose, methyl cellulose, ethyl cellulose, propyl cellulose, hydroxyl ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, $C_{12}$ trimethyl ammonium bromide, $C_{15}$ trimethyl ammonium bromide, $C_{17}$ trimethyl ammonium bromide, dodecylbenzyl triethyl ammonium chloride, cetyl pyridinium bromide, and combinations thereof, and wherein the surfactant is an aqueous solution.

4. A process according to claim 1, wherein the surfactant is a solid and is pre-blended with the at least one polyester resin prior to melt mixing.

5. A process according to claim 1, wherein the de-ionized water is added at a rate of from about 40 g/min to about 400 g/min.

6. A process according to claim 1, wherein the latex particles have a low coarse content of from about 0.01% to about 1%, and a particle size from about 30 nm to about 1000 nm.

7. A process according to claim 1, wherein the latex particles have a solids content of from about 30% to about 45%, and a particle size of from about 60 nm to about 300 nm.

8. A process comprising:

contacting at least one polyester resin and a solid neutralizing agent selected from the group consisting of ammonium hydroxide flakes, potassium hydroxide flakes, sodium hydroxide flakes, sodium carbonate flakes, sodium bicarbonate flakes, lithium hydroxide flakes, potassium carbonate flakes, organoamines, and combinations thereof, in the absence of an organic solvent to form a mixture;

contacting the mixture with a surfactant;

melt mixing the mixture;

contacting the melt mixed mixture with de-ionized water to form an oil in water emulsion; and continuously recovering latex particles having a coarse content of from about 0.01% to about 1%.

9. A process according to claim 8, wherein the polyester resin is selected from the group consisting of amorphous resins, crystalline resins, and combinations thereof.

10. A process according to claim 8, wherein the surfactant is selected from the group consisting of sodium dodecylsulfates, sodium dodecylbenzene sulfonates, sodium dodecyinaphthalene sulfate, dialkyl benzenealkyl sulfates, dialkyl benzenealkyl sulfonates, abitic acid, alkyl diphenyloxide disulfonates, branched sodium dodecyl benzene sulfonates, polyvinyl alcohol, polyacrylic acid, methalose, methyl cellulose, ethyl cellulose, propyl cellulose, hydroxyl ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy)ethanol, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, $C_{12}$ trimethyl ammonium bromide, $C_{15}$ trimethyl ammonium bromide, $C_{17}$ trimethyl ammonium bromide, dodecylbenzyl triethyl ammonium chloride, cetyl pyridinium bromide, and combinations thereof; and wherein the surfactant is an aqueous solution.

11. A process according to claim 8, wherein the surfactant is a solid and is pre-blended with the at least one polyester resin and neutralizing agent prior to melt mixing.

12. A process according to claim 8, wherein the de-ionized water is added at a rate of from about 40 g/min to about 400 g/min.

13. A process according to claim 8, wherein the latex particles have a solids content of from about 30% to about 45%.

14. A process according to claim 8, wherein the latex particles have a particle size of from about 60 nm to about 300 nm.

15. A process comprising:

contacting at least one polyester resin and sodium hydroxide flakes in the absence of an organic solvent to form a mixture;

contacting the mixture with a solid surfactant;

melt mixing the mixture;

contacting the melt mixed mixture with de-ionized water to form an oil in water emulsion; and continuously recovering latex particles having a coarse content of from about 0.01% to about 1%.

16. A process according to claim 15, wherein the polyester resin is selected from the group consisting of amorphous resins, crystalline resins, and combinations thereof.

17. A process according to claim 15, wherein the surfactant is selected from the group consisting of sodium dodecylsulfates, sodium dodecylbenzene sulfonates, sodium dodecyinaphthalene sulfate, dialkyl benzenealkyl sulfates, dialkyl benzenealkyl sulfonates, abitic acid, alkyl diphenyloxide disulfonates, branched sodium dodecyl benzene sulfonates, polyvinyl alcohol, polyacrylic acid, methalose, methyl cellulose, ethyl cellulose, propyl cellulose, hydroxyl ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy)ethanol, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, C12 trimethyl ammonium bromide, $C_{15}$ trimethyl ammonium bromide, $C_{17}$ trimethyl ammonium bromide, dodecylbenzyl triethyl ammonium chloride, cetyl pyridinium bromide, and combinations thereof, and wherein the surfactant is an aqueous solution.

18. A process according to claim 15, wherein the surfactant is a solid and is pre-blended with the at least one polyester resin and neutralizing agent.

19. A process according to claim 15, wherein the de-ionized water is added at a rate of from about 40 g/min to about 400 g/min.

20. A process according to claim 15, wherein the latex particles have a solids content of from about 30% to about 45% and a particle size of from about 60 nm to about 300 nm.

* * * * *